April 19, 1938.    B. N. RODDA    2,114,356
AUXILIARY GRAIN AND/OR FERTILIZER DISTRIBUTOR FOR SEED SOWING IMPLEMENTS
Filed Nov. 7, 1936
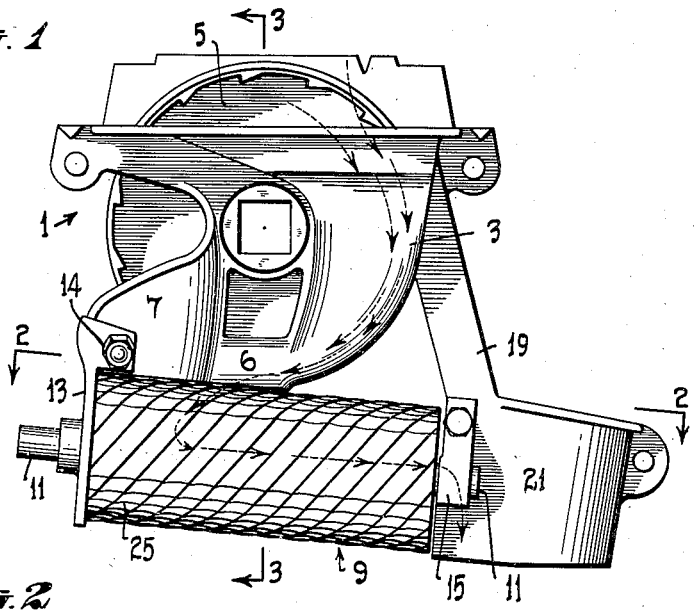
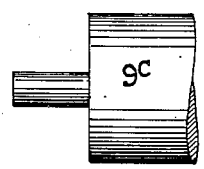
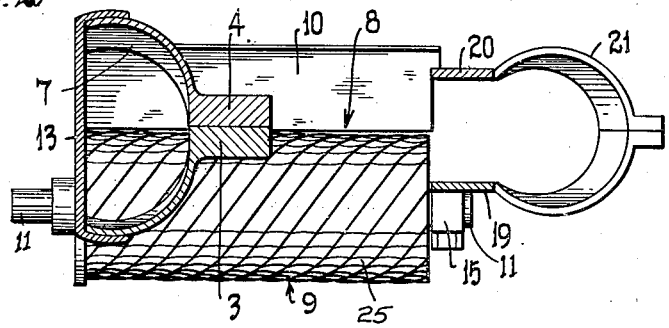
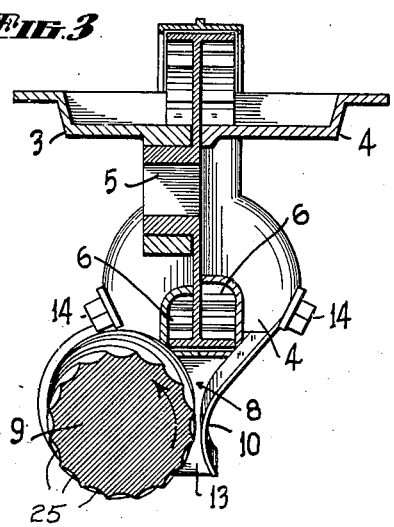
Bertie Norman Rodda
INVENTOR
his ATTY.

Patented Apr. 19, 1938

2,114,356

UNITED STATES PATENT OFFICE 2,114,356

AUXILIARY GRAIN AND/OR FERTILIZER DISTRIBUTOR FOR SEED-SOWING IMPLEMENTS

Bertie Norman Rodda, Prospect, South Australia, Australia

Application November 7, 1936, Serial No. 109,665
In Australia December 16, 1935

2 Claims. (Cl. 221—130)

This invention relates to an auxiliary grain and/or fertilizer distributor for seed-sowing implements such as drills or combines.

It is well known that if maximum yield is to be attained in any crop it is very important that the spacing of the grain when planting be as uniform as possible so that each grain may have the soil area needed for its germination and growth. Similarly it is desirable to evenly distribute the fertilizer so that the soil may be of uniform richness.

With the distributors in use heretofore this ideal has been aimed at but owing to the construction of such devices it has been difficult and probably impossible to achieve an even spacing and distribution and it is therefore the object of this invention to provide an auxiliary distributor which can be used in combination with the present grain or fertilizer distributors or with both to further regulate the distribution so as to achieve a much greater degree of evenness.

My invention comprises the use with each of the grain or fertilizer distributors or with each combination embodying one grain and fertilizer distributor of means forming between them a V-shaped channel into which the material from such distributor or combined distributors is fed and from which it is discharged into a tube which leads to the tilling tool which prepares the soil for the planting, the channel being characterized in that one of its walls is formed by a roller driven so that the face which forms the wall rises while the other wall is stationary.

Various features of the invention will be apparent from the following description of the invention which will be made with reference to the accompanying drawing and in which the preferred construction and a modification of the invention are shown.

In the drawing:—

Fig. 1 is a side elevation of a well-known form of grain distributor embodying my invention, the dotted arrows indicating the path of the grain.

Fig. 2 is a section on line 2—2 of Fig. 1,

Fig. 3 is a section on line 3—3 of Fig. 1, and

Fig. 4 shows one end of a modified form of roller.

The grain feeder 1, which is usually termed a grain run, is of usual construction, it embodying two complementary side members 3 and 4 between which is positioned the feeder wheel 5, and within which are grain feeder channels 6 opening into a cup 7. Normally the grain would flow from this cup directly through conveyor tubes to the ground, but according to my invention the feed from this cup is into one end of a V-shaped channel 8 which is formed between the roller 9 and plate 10.

The roller 9 is supported by a shaft 11 carried at one end in an end member 13 which is secured to the cup 7 by means of bolts 14 and which member 13 forms an end to the cup 7, and at the other end by a bearing 15 supported upon an extension 19 secured to the member 3 of the grain run. There is a similar extension 20 secured to the member 4 of the grain run and formed between these extensions is a cup 21. The plate 10 is supported by the cup 7 and the extension 20.

The roller 9 will be driven by any usual or approved means and the direction of rotation must be such that the face of it which forms the wall of the channel rises. The roller may be constructed of metal, wood or composition or it may be constructed of resilient materials such as rubber, or fabric or the like.

Formed in the face of the roller are shallow spiral grooves 25, the direction of which is such as to move the grain along the channel 8 to the discharge end. The number and pitch of the grooves may be varied according to requirements. The depth is always less than the smallest diameter material being fed. The grooves may be omitted as shown in Fig. 4 in which the roller is indicated by 9C, the rotation and inclination of the roller being sufficient to cause the desired movement of the grain along the channel.

The operation of the device is as follows:—

Grain is fed from a box to one or other side of the feed wheel 5 as heretofore, the grain then being carried around within the one channel 6 according to which side of the wheel is operating, the grain discharging from the channel 6 into the cup 7. As the cup 7 opens directly into the one end of the V-shaped channel 8 formed between the roller 9 and plate 10 and as the roller is revolving the grain is conveyed from the receiving end of such V-shaped channel to the other end thereof to discharge from such end into the cup 21 from which it enters the usual tube which leads to the share or disc by means of which it is sown. The speed of rotation of the roller must be such that the material is fed along the channel and is discharged therefrom at the average rate at which it is fed into the channel. I have found that the material fed into the channel is evenly distributed along the channel when the roller is revolved so that if the feed to the rollers is somewhat uneven it will become evenly distributed as it flows along the channel and will discharge therefrom at a very even rate.

In the device the fertilizer would be fed from the normal feed device into the cup 21 to mingle with the grain.

Instead of using the device to distribute grain it can, of course, be used to distribute the fertilizer only in which case it would be arranged beneath the ordinary fertilizer feed so that the fertilizer is delivered onto the feed end of the channel and is moved along the channel to be discharged over the other end thereof. The roller will, of course, require to contact with the plate or to have so close a spacing that the fertilizer cannot fall through between them.

It would also be possible to use the ordinary grain and fertilizer feeds discharging into a common cup as is the present practice in most drills or combines and to utilize my invention to feed both the grain and fertilizer simultaneously along the channel.

As in the ordinary drill or combine the shares or discs are usually zig-zagged—forward and backward alternately—so my devices can project forwardly and backwardly alternately corresponding to the shares or discs, resulting in a more upright position of the tubes which conduct the grain and/or fertilizer to the ground. Where desired the devices, instead of projecting forward and backward alternately, may be set to all project forward or all project backward or they may even be placed sideways.

While some embodiments of the invention have been disclosed herein as illustrations thereof it is not so intended to limit the invention as many variations in the structure of the parts and the arrangement thereof may be made without departing from the spirit of the invention, the scope of which is indicated by the claims herein.

What I claim is:—

1. For seed-sowing implements an auxiliary distributor positioned beneath the main distributor and comprising; an inclined roller, a plate positioned by the side of the roller to form with the roller an inclined V-shaped channel, means to support the roller and plate, means to drive the roller in a direction to continuously raise the wall of the V-shaped channel formed by said roller, means to guide the material discharged from the main distributor to the upper end of the channel, and means to discharge the material from the lower end of the channel.

2. For seed-sowing implements an auxiliary distributor positioned beneath the main distributor and comprising; an inclined roller, a plate positioned by the side of the roller to form with the roller a V-shaped channel, means to drive the roller in a direction to continuously raise the wall of the V-shaped channel formed by said roller, means to guide the material discharged from the main distributor to the one end of the channel, spiral grooves in said roller to convey the material along the channel, and means to discharge the material from the other end of the channel.

BERTIE NORMAN RODDA.